United States Patent [19]

McMorran

[11] Patent Number: 5,023,548
[45] Date of Patent: Jun. 11, 1991

[54] METHOD AND APPARATUS FOR VERIFYING A HELICAL SCAN RECORDING TAPE USING A PLURALITY OF LINEAR RECORDING HEADS

[75] Inventor: William McMorran, Nottinghamshire, England

[73] Assignee: TDM Tape Services, Ltd., Nottingham, England

[21] Appl. No.: 382,894

[22] Filed: Jul. 21, 1989

[30] Foreign Application Priority Data
Jul. 23, 1988 [GB] United Kingdom ............... 8817600

[51] Int. Cl.[5] .................. G01R 33/12; G11B 27/36
[52] U.S. Cl. ............................ 324/212; 324/243; 360/31; 369/58
[58] Field of Search ............ 324/210, 212, 242, 243; 360/31, 53; 369/58

[56] References Cited

U.S. PATENT DOCUMENTS 2,746,012  5/1956  Price ............................ 324/242
3,670,239  6/1972  Shiraiwa et al. ............... 324/235
4,263,625  4/1981  Warren .......................... 360/31

FOREIGN PATENT DOCUMENTS 171957  2/1986  European Pat. Off.

OTHER PUBLICATIONS

Barth, H. V., *Total Surface Magnetic Tape Test*, IBM Technical Disclosure Bulletin, vol. 14, No. 9, Feb. 1972, pp. 2637, 2638.

Primary Examiner—Gerard R. Strecker
Attorney, Agent, or Firm—Stevens, Davis, Miller & Mosher

[57] ABSTRACT

A system for testing a helical recording tape using linear heads thereby enabling the tape to be run at high speed and shortening the test time uses a multiplexing system to interrogate sequentially short portions of each recorded track the portions being re-assembled in a suitable memory to provide continuous recordings from each track.

5 Claims, 2 Drawing Sheets

METHOD AND APPARATUS FOR VERIFYING A HELICAL SCAN RECORDING TAPE USING A PLURALITY OF LINEAR RECORDING HEADS

The present invention relates to a video tape certifier and more particularly to a certification method and apparatus for certifying magnetic tape used for helical scan recording.

Certification of magnetic tape used for helical scan recording when performed on a Helical Scan Recorder is a slow process as multi track heads cannot be used. In helical scan recording the tape moves at a fixed speed with the record/replay head also moving at a fixed speed. The heads rotate within a drum around which the tape passes at an angle to the line of motion of the head. The resultant recordding forms a diagonal line across the tape for one revolution of the head. By the time the head has completed one revolution the tape has moved forward so the next rotation of the head produces a recording on a parallel line to the first but separated by the distance the tape advanced during 1 rotation of the head. This process continues to produce helical recording for longitudinal movement of the tape. Intermingled with the helical recording are longitudinal recording produced by static heads for audio and control signals.

The frequency of the recorded signal is goverened by the type of tape and the gap of the record/play head. During normal recording the record and replay signal frequency is approaching the maximum for the head therefore preventing replay of the recorded signal at a significantly increased speed. Therefore a 3 hour tape would take 3 hours to evaluate fully using a helical scan recorder and a single channel Magnetic Tape Certifier. It is not possible to use multi track head configuration with helical scan so an alternative method of evaluation is necessary if high speed evaluation is required.

It is an object of the present invention to provide a significantly faster method and apparatus for verifying tapes for helical scan recording.

According to the present invention there is provided a method of verifying a magnetic tape used for helical scan recording by evaluating short sections of the tape with linear scan heads and switching between adjacent linear scan heads at defined intervals of time synchronised with movement of the tape past the heads.

The present invention also provides apparatus for evaluating tape for helical scan recording including a plurality of linear scan heads, means for receiving and storing the outputs form each of the heads and including multiplex switching means for swiching the outputs of predetermined heads at defined time intevals synchronised to the speed of movement of the tape.

Embodiments of the present invention will now be described, by way of example with reference to the accompanying drawings in which:

FIG. 1 diagrammatically illustrates the principle of the present invention;

Figure 1:
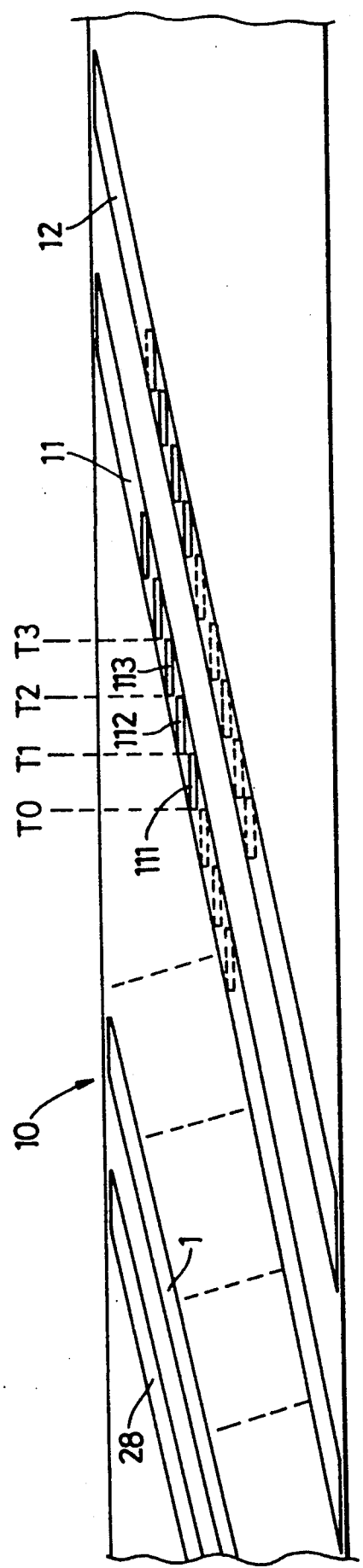

The principle of operation will now be described, with reference now to FIG. 1. A portion of a tape 10 is shown wiht helical scan tracks 11 and 12 shown thereon. For simplicity only two tracks are shown but on a typical tape there could be sixteen or twenty.

Figures 3, 4:
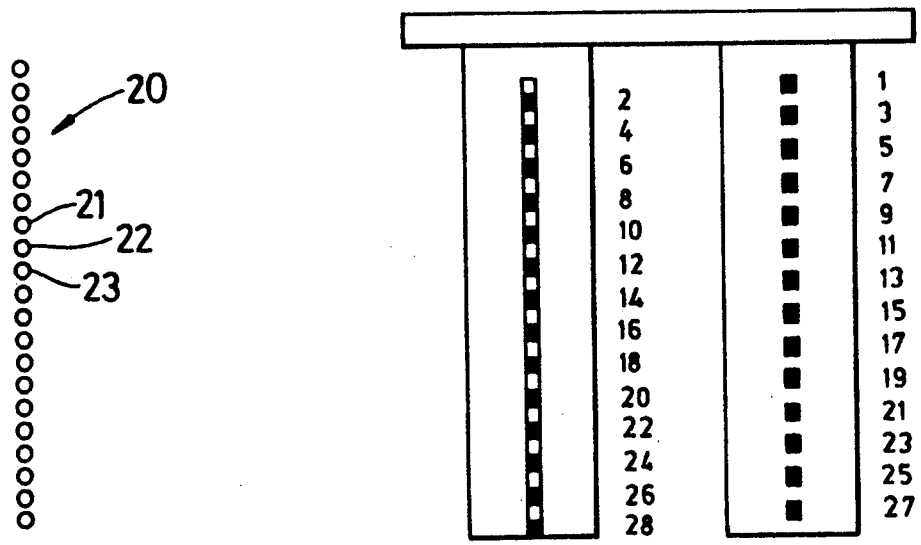
FIG. 3 illustrates the layout of the linear scan heads of FIG. 2.
FIG. 4 illustrates a known interleaved recording head arrangement.

The tracks are formed by the rotating heads and effectively are diagonal across the tape. A series of static linear scan heads 20, 21, 22, 23 . . . etc. (see FIG. 3) are positioned so that for the verification the tape runs at high speed over the head by known means.

A test signal is firstly recored longitudinally down the tape using conventional instrumentation tape recorders in a similar manner to standard instrumentation tape certification.

As the tape runs, taking track 11 as an example, to evaluate track 11 the output is switched from head 23 to 22 to 21 at time intervals T1 and T2. The data read from track 11 therefore comprises outputs from a sequential plurality of heads which is combined to form a continuous read out from track 11 thereby giving a total verification of the track as can be seen by the solid boxes 111, 112, 113 conforming to heads 21, 22 and 23 and by the dotted boxes which conform to the other linear heads.

Thus by switching between linear scan heads at time intervals synchronised to the tape speed the tape can be run at verify high speed over the linear heads enabling verification to be carried out much more quickly.

Figure 2:
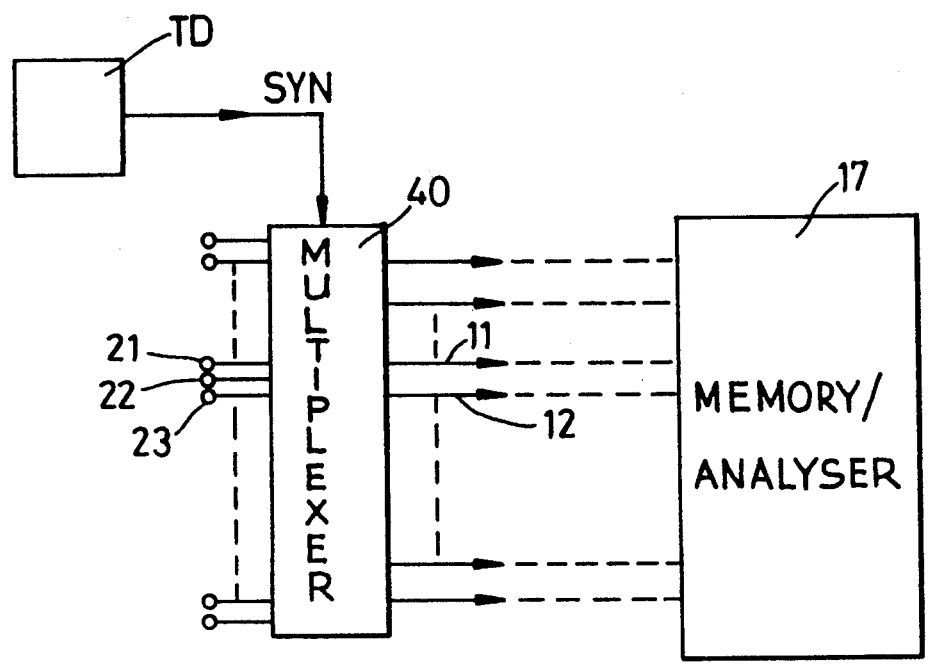
FIG. 2 shows a block diagram of electrical circuitry according to the present invention.

With reference to FIG. 2, the outputs of linear scan heads 20-21, 22, 23 — etc. are connected to a multiplexer 40 the outputs of which comprise effective read outs from the various tracks 11, 12 etc.

The multiplexer is effective, under the control of a synchronising pulse SYN received fromt the tape drive system TD to compensate for the time displacement between heads on an interleaved head geometry. Data from a leading head is stored for a synchronous predetermined time interval related to tape speed in the memory M and multiplexer 40 is used to sequentially extract data from the trailing head and the memory to provide the required total data.

The apparatus therefore provides a pseudo helical scan without and actual helical scan being made on the tape.

In a practical embodiment the number of outputs is equal to the number of longitudinal tracks covering the area of helical recording. If for example there were 28 longitudinal tracks covering the video area then there would be 28 outputs. Therefore when track 1 is switched to output 1 track 2 is switched to output 28, track 3 is switched to output 27 etc, etc. To relate the tape evaluation speed it is necessary to compare the actual head to tape speed of the helical scan recording with the head to tape speed of the longitudinal recording. The signal to be recorded would be of exactly the same wave-length for both mehtods of recording, therefore the results of the two methods of recording can be related. In practice it is impractical to produce in line multi-track heads for longitudinal recording with the number of tracks required. The normal practice is to produce inter-leaved heads where for this application two or three heads would be used in both the record and replay head stacks. In a two head application as shown in the known arrangement of FIG. 4 one head records and replays the odd tracks and the other the even tracks. A three head system would have track 1 on head 1, track 2 on head 2 and track 3 on head 3 and then track 4 on head 1 and so forth. The spacing between the record heads is very percise and equal to the distance between the replay heads. The data being recorded at any instant in time on two adjacent tape tracks is displaced on the tape by the distance between the heads.

Therefore it is not possible to directly produce the Pseudo Helical Scan output as the principle relies on data being simultaneously recorded in line across the tape. Thus as described above to overcome this problem the outputs from the signal level detection circuits from the leaidng heads are digitally stored. The data from the last head is fed directly to the output switching circuit. The stored data from the trailing heads is retrieved from memory with an exact time delay equal to the time taken for the tape to pass between that head and the trailing head. This will be different for each of the leading heads and for each different tape speed.

There are several types of Helical Scan Recorders manufactured which differ in operation by varying the frequency of signal recorded and the angle of the helical scan. The present inventive pseudo Helical Scan Video Tape Certifier electronic sequencing circuit can be switched to produce a Pseudo Helical Scan matched as closely as possible to any Helical Scan recording format on any longitudinal recorder. Hence this single instrument can be used with any longitiudinal instrumentation recorder for either reel to reel or cassette and can be preset to evaluate the tape for use with any helical scan recorder. The accuracy of the evaluation to Helical Scan is directly proportional to the number of longitudinal tracks recorded. The longitudinal control and any audio tracks recorded on the Helical Scan Recorder by the fixed heads can also be evaluated simultaneously with a Helical Scan evaluation. This evaluation is performed as normal longitiudingal certification by feeding the output of the appropriate tracks, which cover these areas of the tape, into separate standard dropout detection circuits.

The testing of linear tapes (standard non helically recorded cassette type tapes) using a continuous test signal read onto and read out from the tape at high speed is well known. The output signal is compared in known manner with the input signal and any deviation above a predetermined error limit is identified as an error. The number of errors on each tape of, for example 3,000 feet, is totalled and if above a predetermined number the tape is rejected. This process is carried out paraticularly for tapes which are to be used for important recordings, such as for archive or master copy recordings which are to be copied from. In known manner the tape can be tested for predetermined faults over the whole length or for faulty short lengths andd rejected if one or both fault criteria are exceeded.

The signals recorded on the tape are thus in known manner determined by the characteristics of the tape being tested. The present invention therefore is not concerned with the exact nature of these signals, they could, for example, be a random series of "1"s and "0"s for digital recording or a signal comprising a selected mixture of frequencies for analog recording. The invention is also not concerned with the error detection system, since this could comprise a digital counting technique for digital recording to count errors between the input and output signals. Such techniques are well established in this field and a competent engineer within this field would have no difficulty in determining the necessary criteria for the test signal and the required fault detection circuitry and aceptable fault level.

Thus the description hereinbefore is directed solely to the inventive technique to adopt previously known testing standards used for linear recordings for helical scan recording.

I claim:

1. A method of verifying an elongate magnetic tape used for helical scan recording, the tape having a define width, the method comprising the steps of recording a plurality f test signals longitudinally down the tape using conventional instrumentation tape recorders in a manner similar to standard instrumentation tape certification, moving the magnetic tape pre-recorded with said test signals in a linear direction corresponding to the length of the tape, postioning at a desired position a set of linear recording heads in a direction across the width of the tape, evaluating the accuracy of a plurality of test signals recorded longitiudinally on the total width of the tape for the entire width of the tape with linear recording heads by evaluating the recorded longitudinal signal, by switching replayed output signals obtained from adjacent linear recording heads at defined intervals of time, the defined intervals of time being synchronized with the speed of the movement of the the past the linear scan heads.

2. A method of verifyiing a magnetic tape as claimed in claim 1 in which signals for verification of the tape are recorded onto the tape and are subsequently read by a first set of linear heads and by a second set of linear heads, the first and second sets of linear heads being spaced a known longitudinal distance apart and the signals from the first and second sets of heads being electronically processed to compensate for the longitudinal distance.

3. Apparatus for verifying a helically recorded magnetic tape including an array of linear scan heads each head being spaced apart by a defined distance across the width of the tape corresponding to the distance between each helically recorded track and including means for interrogating the output of each head for a defined period of time and multiplexer means for switching between selected outputs of adjacent heads of the array of linear scan heads at time intervals synchronized to the speed of movement of the tape and including memory means for storing the signals received from said selected outputs, to simulate a desired one of a plurality of possible helical tracks on the tape.

4. Apparatus as claimed in claim 3 including a first and second array of linear scan heds the first array being positioned to scan even numbered tracks and the second array being positioned to scan odd numbered tracks, the first and second arrays being spaced apart by a defined longitudinal distance along the the path, and including memory means for storing data received from the heads in both the first and second arrays and including means for analysing the contents of the memory to produce outputs representative of the output signals form each track, the means for analysing including delay compensation means for compensating for the signal delay created by the longituidinal distance between the front and second array of linear heads.

5. Apparatus as claimed in claim 3 in which the means for switching between ouputs of adjacent heads comprises a multiplexer.

* * * * *